(12) United States Patent
Kennedy

(10) Patent No.: US 8,749,882 B2
(45) Date of Patent: Jun. 10, 2014

(54) LOW NUMERICAL APERTURE EXCLUSION IMAGING

(75) Inventor: Guy Kennedy, Underhill, VT (US)

(73) Assignee: University of Vermont and State Agriculture College, Burlington, VT (US)

( * ) Notice: Subject to any disclaimer, the term of this patent is extended or adjusted under 35 U.S.C. 154(b) by 504 days.

(21) Appl. No.: 12/994,264

(22) PCT Filed: Mar. 26, 2010

(86) PCT No.: PCT/US2010/028913
§ 371 (c)(1),
(2), (4) Date: Nov. 23, 2010

(87) PCT Pub. No.: WO2010/111649
PCT Pub. Date: Sep. 30, 2010

(65) Prior Publication Data
US 2011/0075255 A1    Mar. 31, 2011

Related U.S. Application Data

(60) Provisional application No. 61/211,261, filed on Mar. 26, 2009.

(51) Int. Cl.
*G02B 21/16* (2006.01)
(52) U.S. Cl.
CPC .................................... *G02B 21/16* (2013.01)
USPC ........................................................ 359/385

(58) Field of Classification Search
None
See application file for complete search history.

(56) References Cited

U.S. PATENT DOCUMENTS

| | | | |
|---|---|---|---|
| 2005/0168808 A1* | 8/2005 | Ishiwata | 359/368 |
| 2005/0185234 A1* | 8/2005 | Kim | 359/35 |

* cited by examiner

*Primary Examiner* — Derek S Chapel

(57) ABSTRACT

An apparatus for a low numerical aperture exclusion imaging apparatus is provided. The apparatus may include an electromagnetic illumination source for illuminating a portion of a specimen; and for collecting an image created by the electromagnetic radiation an objective lens optically coupled to the electromagnetic illuminated portion of the specimen. The apparatus also includes an optical blocking plate disposed between the objective lens and a focusing lens. The optical blocking plate is positioned to substantially block undesired electromagnetic radiation from image sources distally aligned in the same optical axis as the specimen. This invention enhances narrow depth of field characteristics in imaging and also enhances discreet imaging in a narrow focus field by eliminating some or most of the light which contributes to wide depth of field focus which is useful for optical sectioning ranging from microscopy to photography. Optical sectioning provides the information necessary for 3D image reconstructions and other X Axis spatial measurements.

16 Claims, 6 Drawing Sheets

LOW NUMERICAL APERTURE EXCLUSION IMAGING

U.S. provisional patent application 61/211,261 entitled "LOW NUMERICAL APERTURE EXCLUSION IMAGING", naming Guy U. Kennedy as inventor, Mar. 26, 2009.

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith.

BACKGROUND

1. Field of Use

These teachings relate generally to a system and method for microscopy imaging in general and more particularly to a low numerical aperture (NA) exclusion.

2. Description of Prior Art (Background)

Microscopes have been known for some time in the existing art. Very generally, in upright and inverted light microscopes, focusing of the specimen image is accomplished by way of a corresponding positioning of the specimen relative to the objective, specifically in such a way that a specimen region to be detected is arranged in the focal plane of the objective. This can be achieved on the one hand by the fact that the objective, optionally together with the objective turret receiving the objective, is positioned along the optical axis relative to the specimen. In this case the specimen, for example mounted on a conventional specimen slide, is clamped in a corresponding holder on the microscope stage, this microscope stage then not being moved in the direction of the optical axis of the microscope objective. This type of focusing is usually utilized with inverted light microscopes.

On the other hand, the microscope stage can be arranged movably relative to the microscope stand, and positioned in the direction of the optical axis for focusing. In this case the objective does not perform a motion in the direction of its optical axis relative to the microscope stand. The latter type of focusing is usually utilized with upright light microscopes.

Focusing with the aid of the microscope stage also exists, for purposes of the present invention, when the microscope stage comprises a mechanism with which a specimen slide performs a positioning relative to the objective with the aid of a linear or pivoting motion controlled by a galvanometer, as is the case, for example, with some confocal laser scanning microscopes.

Imaging for scientific research has been evolving since the invention of the microscope. Demand has driven the directions in which these innovations have evolved. In recent years, science has brought the demand for high Z axis resolution to satisfy the need for 3D spatial information in molecular studies. Several technologies have been developed to satisfy this need. Notably, Confocal Microscopy, Two Photon Microscopy, Total Internal Reflection Fluorescence (TIRF) Microscopy, and most recently Stimulated Emission Depletion (STED) Microscopy have come to the forefront. All of these techniques have high resolution imaging in a narrow field of focus.

A narrow field of focus facilitates stacking layers of images called "optical sections" to create high resolution 3D composites of thicker sections. Confocal Microscopy and Two Photon Microscopy are very expensive, but fairly versatile. TIRF Microscopy costs less, has the most discrete Z axis imaging, but is only useful within 200 nanometers of the glass surface thus allowing only one optical section. STED Microscopy is also very expensive, with limited availability.

All of these techniques benefit from the elimination or minimization of the out of focus light, improving the signal to noise ratio. Research has resulted in a demand for mapping trajectories of molecules within cells in 3D. This demand is coupled with the need to image with ever increasing frame rates to provide high resolution 3D position at high temporal resolution. There are several variables which limit the speed of such a system, such as the sensitivity of the detection system (camera, photo-detector, etc.), the speed in which the excitation can scan (Confocal, Two Photon), and the speed in which stage steps in the z axis between scans or images. All of these techniques are effective at excluding unwanted out of focus light. This allows improved imaging in a crowded environment.

Traditional microscopy benefits from a wide depth of field. Depth of field refers to the z axis distance in which an image is in high resolution focus. This is a fundamental property of imaging optics. Cameras have an F-stop which is an adjustable aperture located next to the focusing lens. Some microscope lenses have a similar adjustable aperture. When this aperture is reduced in diameter, less light goes through the lens. More importantly, the light that remains is centered through the middle region on the lens with the exclusion of light near the edges. This condition results in a projected image which is illuminated by light rays which are proportionately more normal in angle to the object and image. Because the angles of these rays are smaller with respect to each other, the focus point is less distinct in the Z axis resulting in a wider range of acceptable focus resolution. An extreme example of this effect is a pinhole camera. In this case the rays are not bent at all by a lens, and thus everything at any distance is in focus. A general observation of this effect would to squint one's eyes in order to read in low light. We benefit in our focus ability from bright light, because our pupils are small. A wide aperture passes more light, but has a narrower depth of field. A narrow aperture, passes less light, and produces a wider depth of field. With traditional camera or microscopy configurations when the aperture is open, the depth of field is at its smallest.

BRIEF SUMMARY

The foregoing and other problems are overcome, and other advantages are realized, in accordance with the presently preferred embodiments of these teachings.

In accordance with one embodiment of the present invention an apparatus for a low numerical aperture exclusion imaging apparatus is provided. The apparatus includes an electromagnetic illumination source for illuminating a portion of a specimen; and for collecting an image created by the electromagnetic radiation an objective lens optically coupled to the electromagnetic illuminated portion of the specimen. The apparatus also includes an optical blocking plate disposed between the objective lens and a focusing lens, wherein the optical blocking plate is positioned to substantially block undesired electromagnetic radiation images transmitted through a center portion of the objective lens.

The invention is also directed towards a low numerical aperture exclusion imaging apparatus having an electromagnetic illumination source for examining a specimen. Wherein the low numerical aperture exclusion imaging apparatus includes an objective lens optically coupled to the electromagnetic illuminated portion of the specimen, for and a focusing lens for focusing the image onto a focus plane. The imaging apparatus also includes an optical blocking plate disposed between the objective lens and the focusing lens and is positioned to substantially block electromagnetic radiation transmitted through a center portion of the objective lens. The optical blocking plate includes an absorptive optical filter disposed substantially concentrically with the optical blocking plate; and an optically transparent window disposed contiguously around the outer edge of the absorptive optical filter.

In accordance with another embodiment of the present invention an apparatus a system for low numerical aperture exclusion imaging of a specimen is included. The system includes an optical blocking plate; and an objective lens disposed between the specimen and optically coupled to the specimen, for collecting an image of the specimen. The optical blocking plate is positioned to substantially block electromagnetic radiation. In addition, the system includes multiple types of objective lenses such as, but not limited to, achromat objective lens, a plan achromat objective lens, a fluorite objective lens, a plan fluorite objective lens, and a plan apochromat objective lens.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
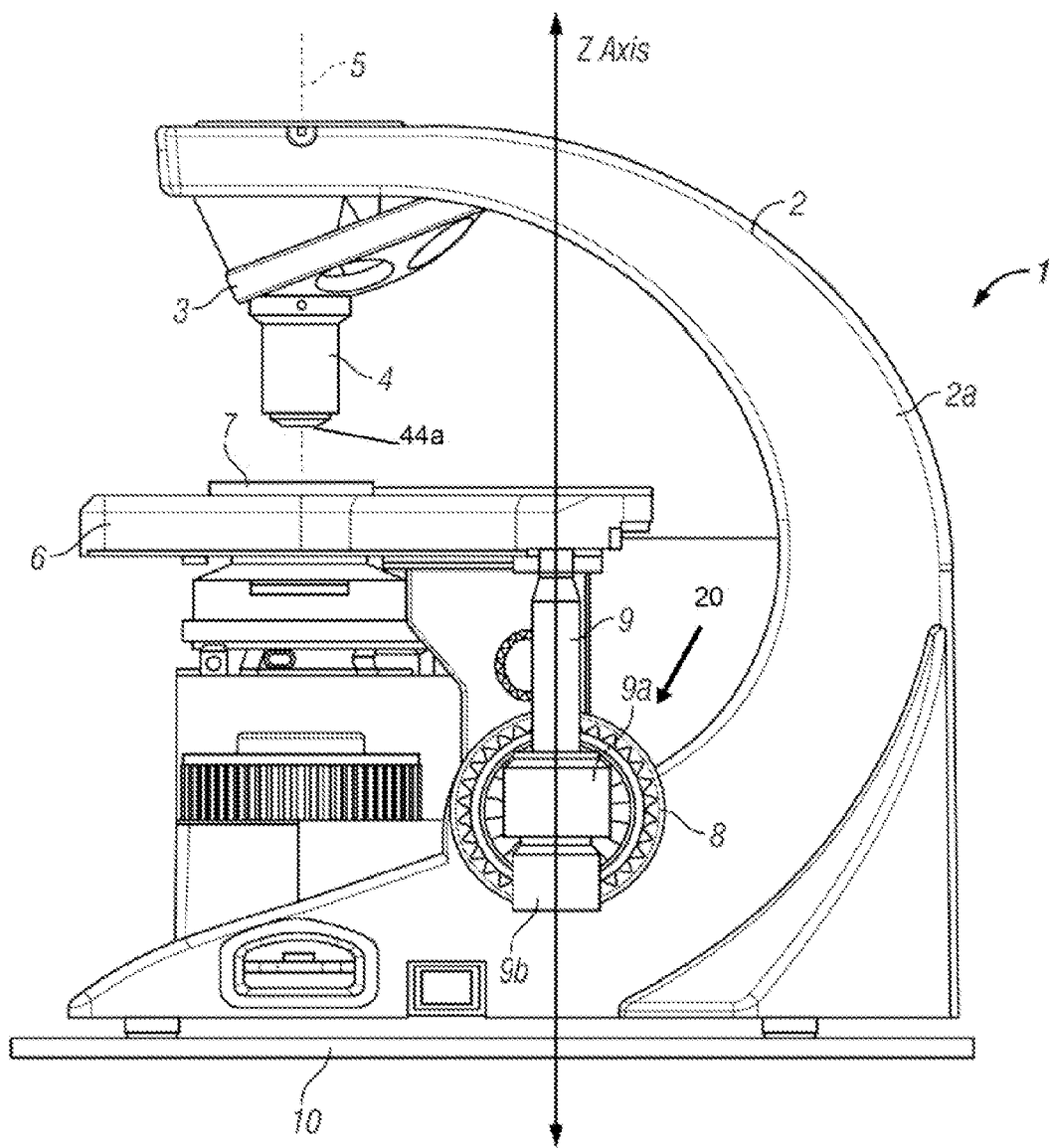
FIG. 1 is a side view of a simple microscope in which the teachings of the present invention is implemented.

Referring now to FIG. 1 there is shown a side view of a simple microscope in which the teachings of the present invention is implemented. It will be understood that any suitable microscope or microscopy system may be used in accordance with the present invention.

Still referring to FIG. 1, microscope 1 encompasses a microscope stand 2. Microscope 1 stands on a support surface 10. Also provided on microscope stand 2 is a turret 3 that carries at least one objective 4. Objective 4 can be pivoted by means of turret 3 into a working position. Objective 4 possesses an optical axis 5 that, in the working position of objective 4, runs perpendicular to a microscope stage 6. A specimen 7 to be investigated can be placed on microscope stage 6.

Microscope 1 also includes a focusing device 20 serving to focus specimen 7, focusing device 20 being installed in the interior of microscope stand 2. With this focusing device 20, microscope stage 6 is positionable relative to microscope stand 2 in the direction of optical axis 5 of objective 4. Focusing device 20 carries two operating elements 8 (only one operating element 8 is depicted in the side view of FIG. 1). Operating elements 8 are provided on the two side walls 2a and 2b of microscope stand 2. With these operating elements 8, a user can enable the displacement of microscope stage 6 in the direction of optical axis 5. The displacement of microscope stage 6 results in a focusing of specimen 7 present on microscope stage 6.

Still referring to FIG. 1, a displacement element 9 for microscope stage 6 is positioned directly in front of operating element 8. Displacement element 9 is connected to microscope stage 6 and enables a displacement of microscope stage 6 perpendicular to optical axis 5, by which means specimen 7 can be positioned in the image field of objective 4. Displacement element 9 encompasses an X element 9a that enables displacement of microscope stage 6 in the X direction. Displacement element 9a further encompasses a Y element 9b that enables displacement of microscope stage 6 in the Y direction.

Still referring to FIG. 1, microscope 1 includes low numerical aperture (NA) exclusion, imaging aperture plates 44 and 44A which will be discussed in more detail herein.

Figure 2:
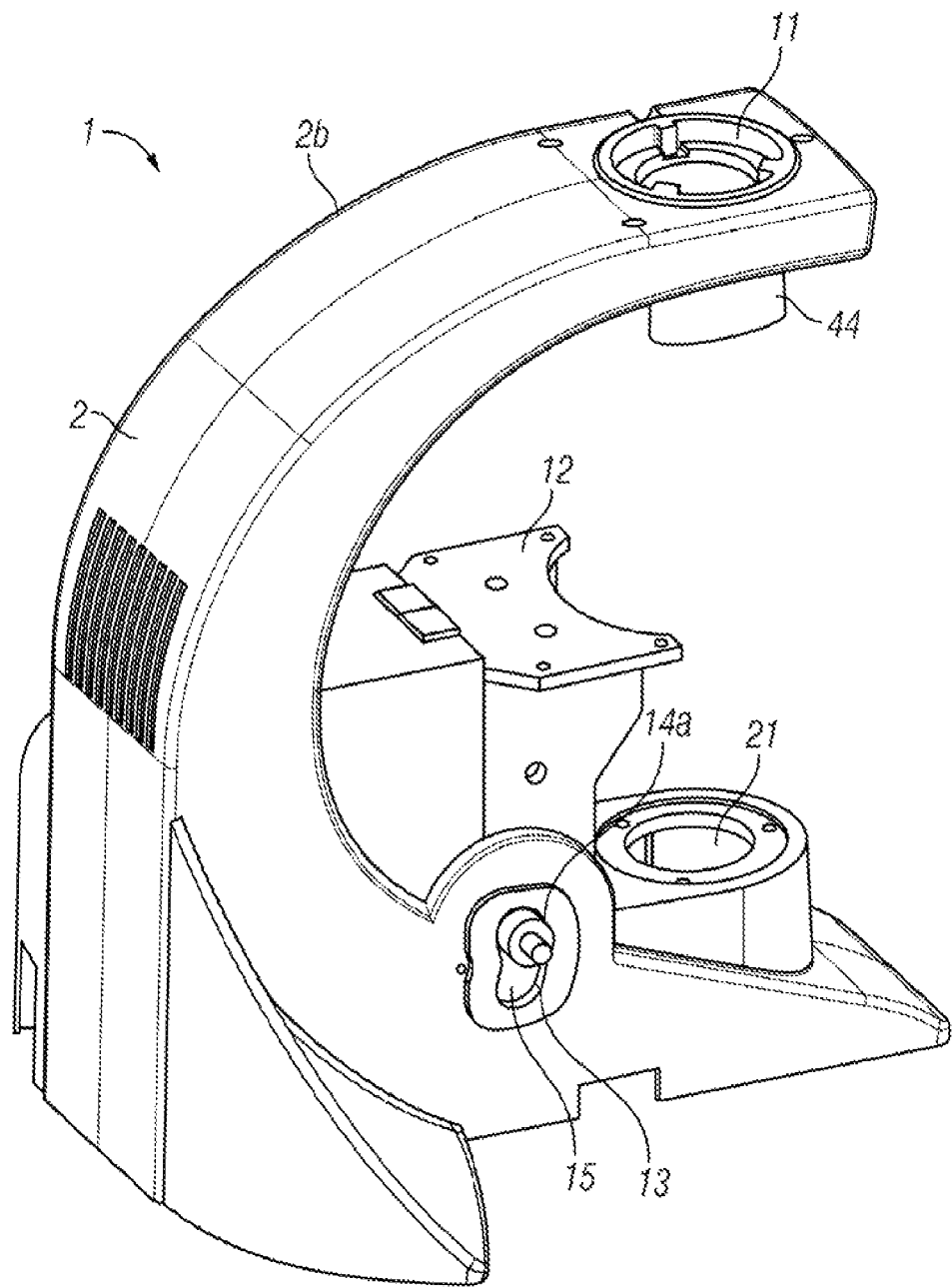
FIG. 2 is a perspective view of the microscope shown in FIG. 1, in which several elements are removed so as to obtain a better impression of the microscope stand in accordance with the mention shown in FIG. 1.

FIG. 2 is a perspective view of microscope 1 in which some elements are removed in order to obtain a better impression of microscope stand 2 and its low NA exclusion imaging aperture 44 configuration. As described herein, Low NA Exclusion Microscopy does not require X-Y axis scans for its excitation or detection when applied in a wide field configuration. The focus simply needs to be shifted between image acquisitions. These discrete focal plane images can be used as optical sections for accurate three dimensional image reconstructions. Because the light gathered is specific to the narrow depth of field component of the light, out of focus portions of the image are excluded improving the discreetness of the focal plane.

Microscope stand 2 possesses a flange 11, e.g. for attaching a binocular eyepiece (not depicted). This is not, however, to be construed in any way as a limitation. Microscope stand 2 further comprises a holding element 12 for microscope stage 6 (see FIG. 1). Holding element 12 is movable by focus device 20 parallel to optical axis 5 of objective 4 that is located in the working position. Focusing device 20 installed in the interior of microscope stand 2 possesses a first end 14a and a second end 14b (not shown). First end 14a and second end 14b engage through an opening 15 on first and on second side wall 2a and 2b, respectively, of microscope stand 2. Illumination source 21 may be any suitable illumination source such as used in bright field microscopy. As already explained in the description relating to FIG. 1, an operating element 8 can be attached respectively onto first and second ends 14*a* and 14*b* of focusing device 20.

In the exemplary embodiment depicted in FIG. 2, opening 15 possesses the shape of a curved elongated hole 13 that is embodied on the oppositely located side walk 2*a* and 2*b* of microscope stand 2. A focusing device (not shown) installed in the interior of microscope stand 2 likewise engages with first end 14*a* and with second end 14*b* (not shown) through opening 15 on first and on second side wall 2*a* and 2*b*, respectively, of microscope stand 2. In this embodiment, opening 15 is configured as longitudinal opening in first and in second side wall 2*a* and 2*b*.

Figure 3:
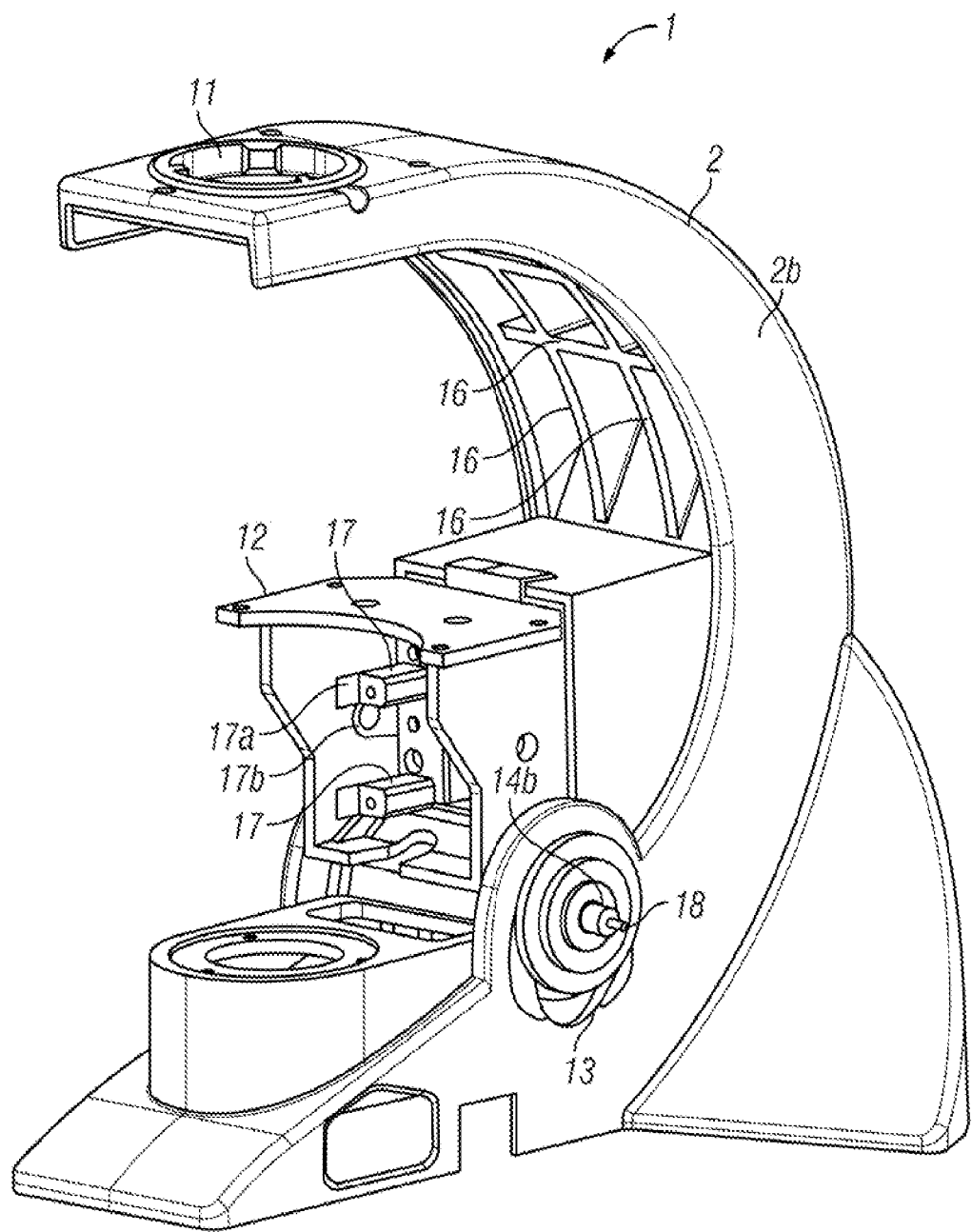
FIG. 3 is a perspective view of the microscope from the front in accordance with the invention shown in FIG. 1.

Referring also to FIG. 3 there is shown a perspective view of microscope 1 from the front. In the interior, Microscope 2 is constructed in part from multiple struts 16. Several installation positions 17 are likewise configured in the interior of holding element 12 of microscope stage 2. Each of installation positions 17 comprises a first stop surface 17*a* and a second stop surface 17*b*. First and second stop surface 17*a* and 17*b*) run perpendicular to one another and are configured in such a way that a component (not depicted) to be attached at that position can be attached with screws in the position without further alignment. In FIG. 3, second end 14*b* of focusing device 20 provided in the interior of microscope stand 2 is visible on second side wall 2*b*. A rotation axis 18 of focusing device 20 is likewise accessible via first and second side wall 2*a* and 2*b*.

Figure 4:
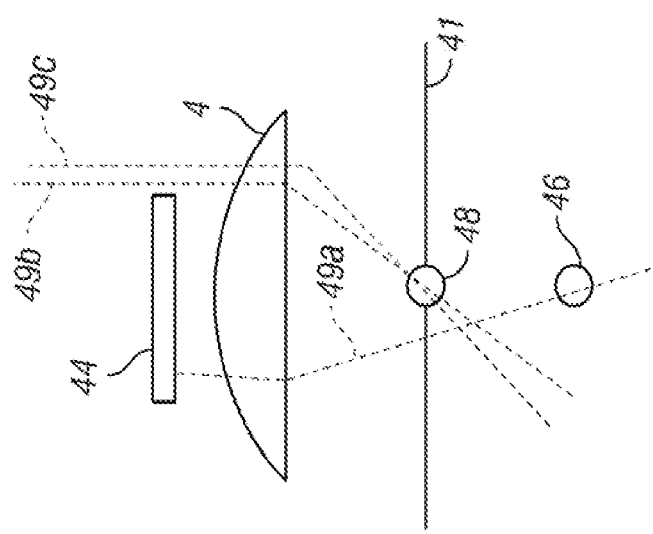
FIG. 4 is an optical diagram of one embodiment of the low numerical aperture imaging features using a single optical blocking aperture in accordance with the invention shown in FIG. 1.

Referring also to FIG. 4, there is shown an optical diagram of one embodiment of the low numerical aperture imaging features using a single optical blocking aperture 44 in accordance with the invention shown in FIG. 1. Objective lens 4 may be any suitable objective lens type. For example, the objective tens type may be achromat, plan achromat, fluorite, plan fluorite, or plan apochromat. It will be further appreciated that the present invention may be used with any suitable imaging lens or assembly in addition to, or in place of the objective lens.

Still referring to FIG. 4, optical blocking aperture 44 may be any suitable optical blocking aperture with a suitable reflection and absorption coefficient to prevent or minimize undesired light from reflecting into objective lens 4. It will also be understood that aperture 44 may also be any suitable wavelength specific blocking aperture. Aperture 44 is suitably positioned to block or eliminate undesired light 49A (or other portions of the electromagnetic spectrum) emanating from object 46 which is distally aligned with particle 48 in the same optical axis 5. It will be appreciated that this arrangement allows desired light depicted by dashed lines 49B,49C (or other portions of the electromagnetic spectrum) emanating or reflecting from particle of interest 48 through objective 4, to be detected directly by the eye, imaged on a photographic plate or captured digitally. It will be understood that particle 48 may be illuminated by any suitable light source. It will be further understood that particle 48 may be a fluorescent particle emitting light when excited by a suitable excitation source. It will also be further appreciated that the light depicted by 49B, 49C which travels through the outer diameter of the objective lens 4 contributes to a narrow depth of field component of an image of the particle of interest 48, because the rays travel at greater angles.

It is also understood that aperture 44 excluding the light traveling through the near center of objective lens 4, that light which produces the widest depth of field, is eliminated. It will be appreciated that this creates a specificity of light, selecting the portion which is derived within the image plane. The result is a narrower depth of focus than could be achieved with conventional optical microscopy or photographic configurations.

Figure 5:
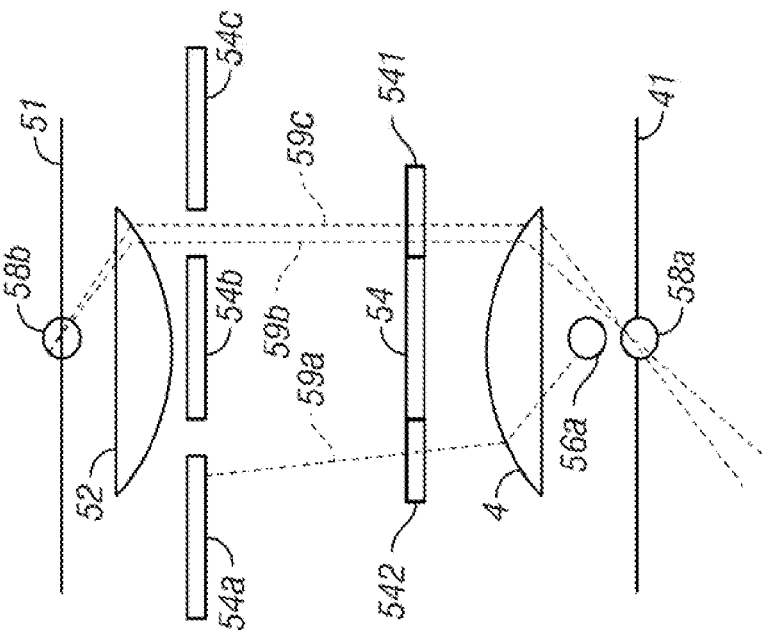
FIG. 5 is an optical diagram of an alternate embodiment of the low numerical aperture imaging features using a plurality of optical blocking apertures in accordance with the invention shown in FIG. 1.

Referring also to FIG. 5, there is shown an optical diagram of an alternate embodiment of the low numerical aperture imaging features using a plurality of optical blocking apertures in accordance with the invention shown in FIG. 1. As described earlier, optical blocking apertures 54A, 54B, 54C, 54 may by any suitable optical blocking apertures. In addition, it will be understood that each of the blocking apertures 54A, 54B, 54C and 54 may be different types of blocking apertures. For example, blocking apertures 54A, 54B, and 54C may each be different wavelength filters. Still referring to FIG. 5, particle 56A lying before the object plane emanates light, depicted by dashed lines 59A, which is blocked by blocking aperture 54A. Particle 58A emanates or reflects light, depicted by dashed lines 59B, 59C which passes by blocking aperture 54 to focusing lens 52 to be focused as image 58B on image plane 51. It will be understood that in alternate embodiments blocking aperture 54 may also include optically transparent windows 542, 541. It will be appreciated that optically transparent windows 542, 541 may be any suitable optical material such as optical glass. It will also be appreciated that optically transparent windows 542, 541 may be wavelength specific filters allowing only selected wavelengths from particle 58A to be focused on focus plane 58B. This overall configuration advantageously blocks defocusing light from particle 56A while simultaneously selecting specific wavelengths of interest.

Figure 6:
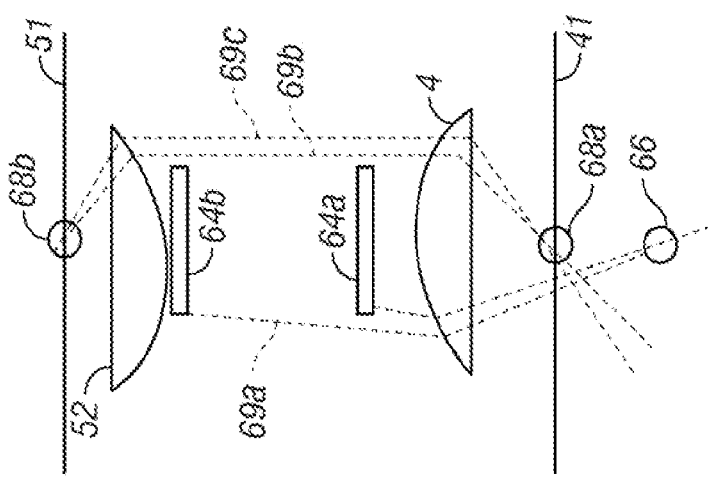
FIG. 6 is an optical diagram of another embodiment of the low numerical aperture imaging features using a second plurality of optical blocking apertures in accordance with the invention shown in FIG. 5.

Referring also to FIG. 6, there is shown an optical diagram of another embodiment of the low numerical aperture imaging features using a second plurality of optical blocking apertures in accordance with the invention shown in FIG. 5. Light rays emanating from particle 68A on the object plane 41 passes through objective lens 4 and focusing lens 52 to be imaged 68B on image plane 51. Light rays emanating from particle 66, lying in the Z direction beyond the objective plane are blocked by blocking apertures 64A and 64B.

Figure 7:
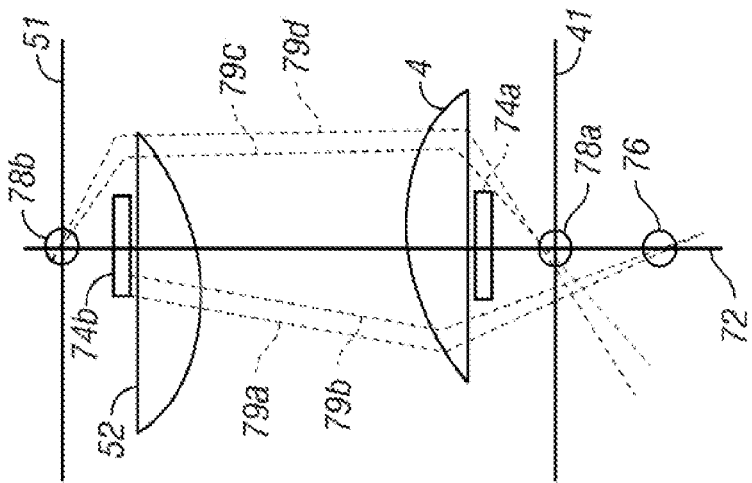
FIG. 7 an optical diagram of another embodiment of the low numerical aperture imaging features using a thud plurality of optical blocking apertures in accordance with the invention shown in FIG. 5.

Referring also to FIG. 7 there shown is an optical diagram of another embodiment of the low numerical aperture imaging features using a third plurality of optical blocking apertures in accordance with the invention shown in FIG. 5. As shown in FIG. 7, unwanted optical rays from particle 7Z, depicted as dashed lines 79A, 79B are blocked by blocking aperture 74B. Likewise, although not shown in FIG. 7, unwanted light rays are also blocked by blocking aperture 74A located after focusing lens 52. It will be understood that blocking apertures 74A and 74B prevent light from particle 7Z from defocusing, or otherwise interfering with light from particle 78A passing through objective 4 and focus lens 52 and imaging on image plane 51 as particle 78B.

Figure 8:
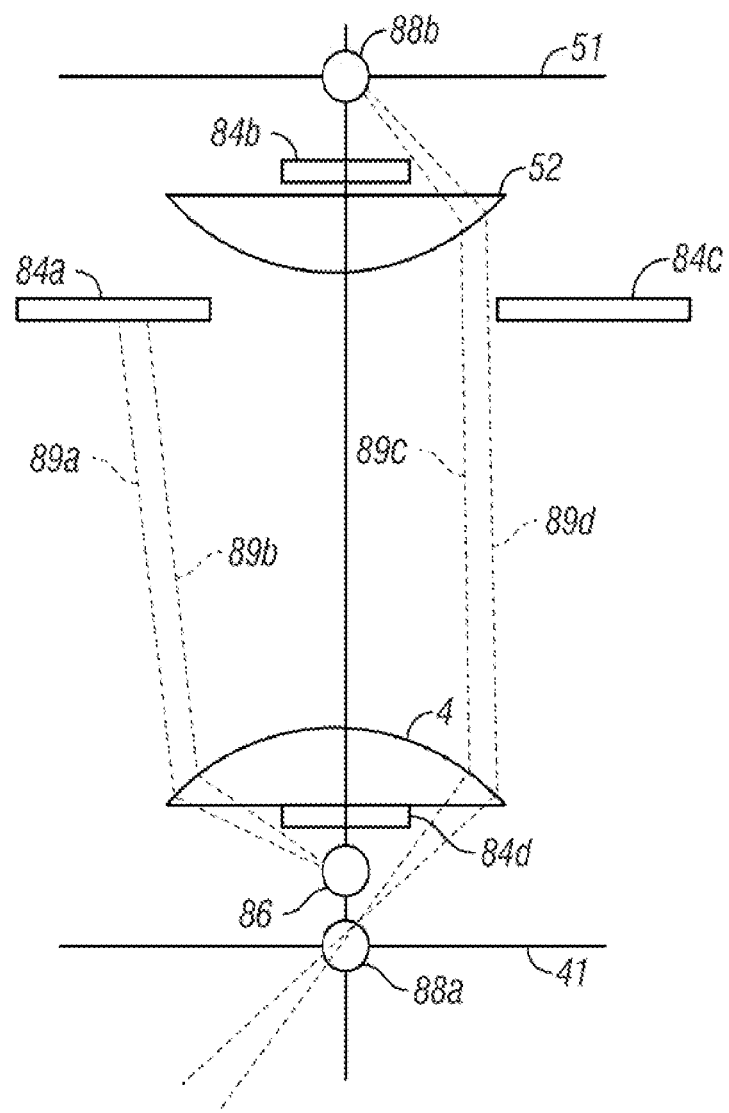
FIG. 8 is an optical diagram of another embodiment of the low numerical aperture imaging features using a fourth plurality of optical blocking apertures in accordance with the invention shown in FIG. 5.

Referring also to FIG. 8, there is shown an optical diagram of another embodiment of the low numerical aperture imaging features using a fourth plurality of optical blocking apertures in accordance with the invention shown in FIG. 5. Blocking apertures 84A and 84C prevent unwanted light rays with obtuse angles, with respect to the objective 4, from defocusing desired light from particle 88A. Likewise, blocking aperture 84D prevents unwanted light from passing through center region of objective 4. Blocking aperture 84B prevents unwanted focused light from reaching the image plane and distorting the focused light from particle 88A and imaged as particle 88B on the image plane.

As shown by FIG. 4 through FIG. 8, it will be appreciated that the location and method of the light exclusion blocking apertures is variable depending upon the specific application. It will also be appreciated, as noted earlier, that the light exclusion blocking apertures can be wavelength specific. An example of this would be use of an optical filter medium which would filter certain wavelengths, while allowing other wavelengths to pass.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims. For example, Low NA Exclusion Objective microscopy features, as described herein, can be applied to most forms of light microscopy. The benefit of detecting and or exciting with the High NA component of light is achievable in both Brightfield and Fluorescence microscopy. For example, In Confocal Microscopy, the benefit from a Low NA Exclusion Objective lens arrangement as described herein would also apply to fluorescence excitation and fluorescence emission. The Z axis of the Confocal spot, is longer than the XY axis. If only the High NA component of excitation light is utilized to produce the Confocal spot, The Z axis illumination will be smaller resulting in a thinner Z axis scan.

It will also be appreciated that there is an ever increasing demand for higher resolution light microscopy. New developments continue to provide ever increasing resolution, particularly in the XY axis which is beyond what was believed possible only 10 years ago. Recently major microscopy manufactures have introduced High Numerical Aperture Objective lenses. These lenses were created to satisfy the demand for "Through the Lens" TIRF Microscopy. These lenses are a natural choice when considering Low NA Exclusion Microscopy features as described herein. Low NA Exclusion Microscopy features as described herein can be a modification made to older modest microscopy systems, or as a feature to new manufactured microscopes, including TIRF microscopes. It can be a very inexpensive addition that would add important capability. There are numerous configurations for this invention that dovetail into existing microscopy systems.

Likewise, the inventive features described herein can also be used as enhancement for Photo-Activated Localization Microscopy (PALM). This new form of high resolution light microscopy can use the narrower field of light provided by the invention described herein to make the photo-activated regions more specific in the Z axis. Similarly STED, is another apparatus that can use the narrower field of light provided by the invention described herein to result in higher Z axis resolution.

What is claimed is:

1. A low numerical aperture exclusion imaging apparatus, comprising:
    an electromagnetic illumination source for illuminating a portion of a specimen;
    an objective lens optically coupled to the electromagnetic illuminated portion of the specimen, for collecting an image created by the electromagnetic radiation illuminating a portion of the specimen;
    a focusing lens for focusing the image onto a focus plane; and
    an optical blocking plate disposed between the objective lens and the focusing lens, wherein the optical blocking plate is positioned to substantially block electromagnetic radiation transmitted through a center portion of the objective lens, and wherein the optical blocking pate, objective lens, and focusing lens are symmetric about a common axis, and wherein the optical blocking plate comprises a single wavelength transmission filter.

2. The low numerical aperture exclusion imaging apparatus as in claim 1 wherein the electromagnetic illumination source for illuminating a portion of a specimen comprises a white light illuminating source.

3. The low numerical aperture exclusion imaging apparatus as in claim 1 wherein the electromagnetic illumination source for illuminating a portion of a specimen comprises an ultraviolet illuminating source.

4. The low numerical aperture exclusion imaging apparatus as in claim 1 wherein the objective lens comprises an objective lens selected from the group consisting of an achromat objective lens, a plan achromat objective lens, a fluorite objective lens, a plan fluorite objective lens, and a plan apochromat objective lens.

5. The low numerical aperture exclusion imaging apparatus as in claim 1, wherein the single wavelength transmission filter comprises a plurality of single wavelength transmission filters.

6. The low numerical aperture exclusion imaging apparatus as in claim 1 wherein the optical blocking plate comprises an absorptive optical filter.

7. The low numerical aperture exclusion imaging apparatus as in claim 6, wherein the absorptive optical filter comprises a plurality of absorptive optical filters.

8. The low numerical aperture exclusion imaging apparatus as in claim 1 further comprising a second optical blocking plate disposed between the objective lens and the specimen, wherein the second optical blocking plate is positioned to substantially block electromagnetic radiation transmitting through a center portion of the objective lens, and wherein the second optical blocking pate, objective lens, and focusing lens are symmetrical about a common axis.

9. A low numerical aperture exclusion imaging apparatus having an electromagnetic illumination source for examining a specimen, wherein the low numerical aperture exclusion imaging apparatus comprises;
    an objective lens optically coupled to the electromagnetic illuminated portion of the specimen, for collecting an image created by the electromagnetic radiation illuminating a portion of the specimen;
    a focusing lens for focusing the image onto a focus plane; and
    an optical blocking plate disposed between the objective lens and the focusing lens, wherein the optical blocking plate is positioned to substantially block electromagnetic radiation transmitted through a center portion of the objective lens, and wherein the optical blocking pate, objective lens, and focusing lens are symmetric about a common axis, and wherein the optical blocking plate comprises an absorptive optical filter disposed substantially concentrically with the optical blocking plate; and
    an optically transparent window disposed contiguously around the outer edge of the absorptive optical filter.

10. The low numerical aperture exclusion imaging apparatus as in claim 9 wherein the objective lens comprises an objective lens selected from the group consisting of an achromat objective lens, a plan achromat objective lens, a fluorite objective lens, a plan fluorite objective lens, and a plan apochromat objective lens.

11. The low numerical aperture exclusion imaging apparatus as in claim 9 wherein the optical blocking plate comprises a plurality of optical blocking plates.

12. The low numerical aperture exclusion imaging apparatus as in claim 9, wherein the optically transparent window comprises a single wavelength transmission filter.

13. The low numerical aperture exclusion imaging apparatus as in claim 9 further comprising a second optical blocking plate disposed between the objective lens and the specimen, wherein the second optical blocking plate is positioned to substantially block electromagnetic radiation transmitting through a center portion of the objective lens, and wherein the second optical blocking pate, objective lens, and focusing lens are symmetric about a common axis, and wherein the second optical blocking plate comprises:

a second absorptive optical filter disposed substantially concentrically with the second optical blocking plate; and a second optically transparent window disposed contiguously around the outer edge of the second absorptive optical filter.

14. A low numerical aperture exclusion system for imaging a specimen, the system comprising:

an imaging lens;

an optical blocking plate disposed between the specimen and the imagining lens and optically coupled to the specimen, for collecting an image of the specimen; and wherein the optical blocking plate is positioned to substantially block electromagnetic radiation transmitted through a center portion of the imaging lens, and wherein the optical blocking pate and the imaging lens are symmetric about a common axis, and wherein the optical blocking plate comprises:

an absorptive optical filter disposed substantially concentrically with the optical blocking plate; and an optically transparent window disposed contiguously around the outer edge of the absorptive optical filter.

15. The low numerical aperture exclusion imaging system as in claim 14 wherein the imaging lens comprises an objective lens selected from the group consisting of an achromat objective lens, a plan achromat objective lens, a fluorite objective lens, a plan fluorite objective lens, and a plan apochromat objective lens.

16. The low numerical aperture exclusion imaging system as in claim 14 further comprising a second optical blocking plate disposed between the imaging lens and the specimen, wherein the second optical blocking plate is positioned to substantially block electromagnetic radiation transmitting through a center portion of the imaging lens, and wherein the second optical blocking pate, imaging lens, and focusing lens are symmetrical about a common axis, and wherein the second optical blocking plate comprises:

a second absorptive optical filter disposed substantially concentrically with the second optical blocking plate; and a second optically transparent window disposed contiguously around the outer edge of the second absorptive optical filter.

* * * * *